(12) United States Patent
Zhang et al.

(10) Patent No.: US 8,909,596 B1
(45) Date of Patent: Dec. 9, 2014

(54) OPERATIONAL-TRANSFORM-COMPATIBLE REPRESENTATION OF 2-DIMENSIONAL PAGE LAYOUT DATA

(71) Applicant: Google Inc., Mountain View, CA (US)

(72) Inventors: Eric Zhang, Mountain View, CA (US); Santos Cordon, Mountain View, CA (US); Kevin Markman, Mountain View, CA (US); James Watts, Mountain View, CA (US); Michael Verrilli, Mountain View, CA (US); Olga Sergeyevna Belomestnykh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 97 days.

(21) Appl. No.: 13/736,816

(22) Filed: Jan. 8, 2013

(51) Int. Cl.
*G06F 17/30* (2006.01)
*G06Q 10/10* (2012.01)
*G06F 17/24* (2006.01)

(52) U.S. Cl.
CPC ........ *G06F 17/30011* (2013.01); *G06Q 10/101* (2013.01); *G06Q 10/103* (2013.01); *G06F 17/30168* (2013.01); *G06F 17/24* (2013.01)
USPC .......................................... 707/608; 715/234

(58) Field of Classification Search
CPC ... G06F 17/24; G06F 17/30168; G06Q 10/10; G06Q 10/101; G06Q 10/103
USPC .......................................... 707/608; 715/234
See application file for complete search history.

(56) References Cited

U.S. PATENT DOCUMENTS

2011/0296317 A1* 12/2011 Ishihara et al. ............... 715/753

OTHER PUBLICATIONS

Davis, A. H., Sun, C., & Lu, J. (Nov. 2002). Generalizing operational transformation to the standard general markup language.*
Hirsimaa et al., An Analysis on Operational Transforms, 2010.*
Palmer, C. R., & Cormack, G. V. (1998). Lock-free distributed objects A shared spreadsheet. Department of Computer Science, University of Waterloo. Technical Report CS-98-04.*
Sun, Operational Transformation Frequently Asked Questions and Answers, 2011.*

* cited by examiner

*Primary Examiner* — William Spieler
(74) *Attorney, Agent, or Firm* — Birch, Stewart, Kolasch & Birch, LLP

(57) ABSTRACT

Solutions, systems, and techniques for applying 2-dimensional changes to a shared document are discussed. The document is divided into vertical columns of a particular width, each column represented as a one-dimensional vector that is a sequential list of blocks in that column, each block representing a content item included in the document. Each block has a starting column, a block height, and a block width indicated by how many columns the block occupies. Each block has row indexes that represent a relative position of the block in each column it occupies. A document modification command is represented as transfer functions, each transfer function corresponding to a document column. The transfer functions are applied to the document columns to alter a row index of block(s) in the corresponding column(s), thereby altering the relative position of a block with respect to other blocks in that column.

20 Claims, 9 Drawing Sheets

| | Mutation 2 | Delete | Insert | Move |
|---|---|---|---|---|
| Mutation 1 | /2200 | /2210 | /2220 | /2230 |
| Delete | | Decrement indexes if first deleted block is above deletion point | Decrement indexes if deleted block is above insertion point | Decrement indexes if deleted block is above insertion point |
| Insert | | Increment indexes if insertion block is above deletion point | Increment indexes if first insertion is above insertion point | Increment indexes if first insertion is above insertion point |
| Move | | Decrement indexes if original block position is above deletion point, increment indexes if new block position is above deletion point | Decrement indexes if original block position is above insertion point, increment indexes if new block position is above insertion point | Decrement indexes if original block position is above insertion point, increment indexes if new block position is above insertion point |

Fig. 2b

OPERATIONAL-TRANSFORM-COMPATIBLE REPRESENTATION OF 2-DIMENSIONAL PAGE LAYOUT DATA

BACKGROUND

Document collaboration and online collaborative environments that allow for multiple users to view and edit a single document are becoming more widespread. In certain settings, such as word processing or spreadsheets, where layouts and page structure are fixed or otherwise dictated by the application, changes to a document may be expressed as a one-dimensional array. Techniques such as Operational Transforms (OT) can easily handle mutations on linear layout data simply by shifting the concurrent edits along a single dimension. However, when changes are made to page layout or structure, such changes must be expressed in a 2-dimensional array. However, the handling of 2-dimensional layout data is more challenging. This because it is often difficult to address the content in a consistent manner, and also because complex interactions between components may arise from simple changes, even in systems with very well defined behavior.

SUMMARY

In some cases, web pages may be organized into columns and blocks (header, footer, sidebar, body, etc), and a flow layout (treating all the blocks as a single string and wrapping where needed) does not allow these page layouts to be easily realized. By splitting the document into columns and addressing blocks vertically within them, these sorts of layouts can be more readily and more easily constructed, scaled to the width of a browser window, and stably positioned across a wide variety of display sizes.

Embodiments of the techniques and systems discussed herein may pertain to a system for applying multiple changes to a shared document in a state-less manner, the system comprising: a processor; and a processor-readable memory having stored thereon a representation of the shared document as a series of one-dimensional vectors, where each one-dimensional vector corresponds to a vertical column of a particular width, the shared document being divided into a particular number of the vertical columns, and where each one-dimensional vector represents a top-down sequential list of blocks in that column, each block representing a content item included in the document and each block being associated with a starting column location, a block height, and a block width, where the block width is represented by a number of columns the block occupies; and where each block is associated with at least one row index, each associated row index representing a relative position of the block in each document column occupied by that block in relation to other blocks in that column; and the processor-readable memory having stored thereon instructions which, when executed by the processor, cause the processor to increase or decrease a row index of a particular block to indicate a change in the relative position of that particular block in each column occupied by the block according to a transfer function, the transfer function representing an effect of a document modification command on a particular column in the document, the document modification command including at least one of an insertion of a new block into the shared document, a deletion of an existing block from the shared document, re-positioning of a block within the shared document, and a change in the height or width of a block within the shared document.

In some embodiments, the transfer function is a converged transfer function representing cumulative effects of two or more sequentially-applied document modification commands on the particular column in the document. In some embodiments, the row indexes of a block spanning two or more columns are set such that the block is represented as a continuous entity within the shared document.

In some embodiments, a transfer function associated with an effect of a block insertion command on a particular column in the shared document includes incrementing the row indexes of all blocks in the particular column located below an insertion point associated with the block insertion command. In some embodiments, a transfer function associated with an effect of a block deletion command on a particular column in the shared document includes decrementing the row indexes of all blocks in the particular column located below a deletion point associated with the block deletion command.\

In some embodiments, a transfer function associated with an effect of a block deletion command on a particular column in the shared document includes decrementing the row indexes of all blocks in the particular column located below a deletion point associated with the block deletion command; and a transfer function associated with an effect of a block re-positioning command is represented as a converged transfer function representing cumulative effects of a block deletion command and a subsequent block insertion command.

In some embodiments, a transfer function is represented as a series of increases and/or decreases to row index values of blocks within a column and where a converged transfer function represents a result of adding and reconciling at least two transfer functions.

In some embodiments, the processor and memory are included as part of a collaborative document editor accessible to multiple users via an information network. In some embodiments, the shared document is divided into sixty-four vertical columns. In some embodiments the number of columns in the document is determined based on a number and distribution of blocks within the document.

Embodiments of the techniques and systems discussed herein may pertain to a method of applying multiple changes to a shared document in a state-less manner, where the shared document is represented as a series of one-dimensional vectors, each one-dimensional vector corresponding to a vertical column of a predetermined width, where the shared document is divided into a predetermined number of the vertical columns, where each one-dimensional vector represents a top-down sequential list of blocks in that column, each block representing a content item included in the document and each block being associated with a starting column location, a block height, and a block width, where the block width is represented by a number of columns the block occupies; where each block is associated with at least one row index, each associated row index representing a relative position of the block in each document column occupied by that block in relation to other blocks in that column, the method comprising: receiving, at a server that controls a master copy of the shared document, a first document modification command, the first document modification command including at least one of an insertion of a new block into the shared document, a deletion of an existing block from the shared document, re-positioning of a block within the shared document, and a change in the height or width of a block within the shared document; representing the first document modification command as one or more first transfer functions, where each of the first transfer functions corresponds to a column of the shared document; applying the one or more first transfer functions to the corresponding columns of the master copy of the shared document, where each of the one or more first transfer functions alters a row index of a block in the corresponding column, thereby altering the relative position of that block with respect to other blocks in the corresponding column; and propagating, from the server, the applied transfer functions to at least an originator of the document modification command.

In some embodiments, the method may include the steps of: in response to receiving, at the server that controls a master copy of the shared document, a second document modification command before carrying out the step of applying with respect to the first document modification command, representing the second document modification command as one or more second transfer functions, where each of the second transfer functions corresponds to a column of the shared document; for those columns associated with a first transfer function and a second transfer function, converging the first transfer function and the second transfer function into a converged transfer function, the converged transfer function representing cumulative effects of the first document modification command followed by the second document modification command; and where the step of applying includes applying the one or more first transfer functions and applying the one or more second transfer functions by applying the converged transfer functions to those columns associated with a first transfer function and a second transfer function.

In some embodiments, the method may include the steps of: converging the one or more first transfer functions with one or more predecessor transfer functions associated with one or more previously received but not yet applied document modification commands to create one or more converged transfer functions representing cumulative effects of the predecessor transfer functions command followed by the first document modification command; and where the step of applying the one or more first transfer functions to the corresponding columns of the master copy of the shared document is at least partially realized by applying the one or more converged transfer functions to corresponding columns of the master copy of the shared document.

In some embodiments, a transfer function associated with an effect of a block insertion command on a particular column in the shared document includes incrementing the row indexes of all blocks in the particular column located below an insertion point associated with the block insertion command.

In some embodiments, a transfer function associated with an effect of a block deletion command on a particular column in the shared document includes decrementing the row indexes of all blocks in the particular column located below a deletion point associated with the block deletion command.

In some embodiments, a transfer function associated with an effect of a block deletion command on a particular column in the shared document includes decrementing the row indexes of all blocks in the particular column located below a deletion point associated with the block deletion command; and a transfer function associated with an effect of a block re-positioning command is represented as a converged transfer function representing cumulative effects of a block deletion command and a subsequent block insertion command.

In some embodiments, a transfer function is represented as a series of increases and/or decreases to row index values of blocks within a column and where a converged transfer function represents a result of adding and reconciling at least two transfer functions.

In some embodiments, the method may include: determining which columns of the shared document are affected by the received document modification command; and where the step of representing includes generating a transfer function for each column of the shared document affected by the received document modification command.

Further embodiments of such a method or combination of methods may include any or all of the steps described or implied above in the discussion of the system and method aspects of this concept.

Embodiments of the techniques and systems discussed herein may pertain to a computer-readable medium having embodied thereon a set of instructions which, when executed by a processor, cause the processor to carry out one or more of the methods, method steps, and/or combinations thereof as described above.

Further scope of applicability of the systems and methods discussed herein will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein

FIG. 2b depicts an exemplary embodiment of a diagram representing handling of multiple sequential mutations as described herein;

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

This document outlines techniques and examples to address issues of sequence-independent, collaborative document editing for documents where the layout, structure, and overall information content of the document are all simultaneously editable by multiple users. One embodiment of the techniques and examples discussed below may be suitable for applications such as browser-based or web-based collaborative editing and design tools to create and lay out web pages and related online content.

In an online collaborative environment, multiple users may access a shared document through an interface such as a web browser. In some cases, each user may have a web browser window open to view a document that all the users are capable of editing. The changes or edits made by any one user to the document must eventually be reflected in all the browser windows of all the other users simultaneously viewing and/or editing the document. Such change propagation may be realized by making the edit to a locally cached version of the document stored on the user's computing device and also propagating that change back to the "master" version of the document, from where the change then becomes visible/evident to all other users editing/viewing the document.

In some cases, two or more users may make simultaneous edits. Such edits may include, in the context of a word processing application, adding or removing words or changing a font style or format. In some such cases, the edits may be conflicting or otherwise potentially incompatible. For example, one user may attempt to delete a block of text which another user has attempted to make bold or otherwise alter. Such simultaneous changes and potential editing conflicts may be resolved using Operational Transforms (OTs), by representing the document as a one-dimensional array of changes. In such a paradigm, the entire document is essentially a string of spacers and changes, called mutations, are addressed using indexes of those spacers. This addressing system allows mutations to be easily transformable against each-other since each mutation will simply increment or decrement the indexes of other mutations in the array. Using a "last-mutation-wins" approach, mutations can be processed with respect to the "master" version in the order in which they are propagated thereto, removing potential conflicts from otherwise apparently simultaneous mutations.

Figure 1A:
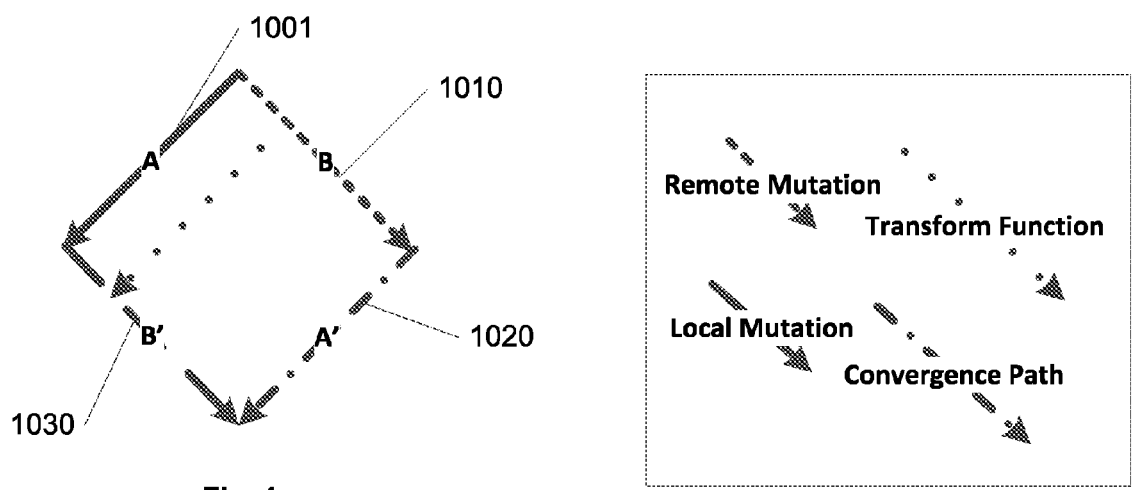
FIG. 1a depicts an embodiment of a diagram representing a convergence of two mutations in a shared document.

FIG. 1a shows an embodiment of a simple convergence operation to reconcile a first mutation 1001 and a second mutation 1010 made to a document. By using a state-less paradigm, it is possible to converge the document to an identical state regardless of whether change B 1030 is applied after change A 1001 or change A 1020 is applied after change B 1010. In either case, the document will look the same after both changes are applied.

In some embodiments, the first mutation 1001 may be a mutation made by a user/editor to a locally cached instance of a shared document. The second mutation 1010 may be mutation propagated from the "master" document to all currently viewed/edited instances of the shared document. The "master" document must therefore converge the first mutation 1001 and the second mutation 1030 to create a document that represents an outcome of both editing operations. Similarly, the locally cached instance must converge the propagated mutation 1010 and the local mutation 1020 to create a document identical to that created by the "master" convergence.

Because the overall document structure of a word-processing or spreadsheet document is somewhat fixed, OTs provide a useful solution. However, in situations such as collaborative web design, the fundamental layout and structure of the document is subject to change. In particular, 2-dimensional movement and document objects of various spans cannot be suitably represented in a one-dimensional array of mutations. Such layout and document structure changes require a 2-dimensional array because a location of a change operation within the page, including its effect on other page structures, may need to be tracked in conjunction with the change operation itself.

The techniques, solutions, and devices described in this document are meant to present one or more embodiments of: (1) a well defined set of interactions between content in the 2dimensional layout as various changes are made (position, size, etc); (2) a system of indexing into the content in a consistent, addressable fashion; and (3) a set of mutations enabling concurrent modification of content with automatic conflict resolution.

Embodiments of such a solution may be realized by dividing the editable space of a web page into a series of vertical columns. A web page component, such as a text box, an image, or some other feature, may be configured to occupy multiple columns and may also occupy varying heights of the columns. Vertical height can be determined in pixels or points or some other system-supported or otherwise generic measure. Horizontal width of a web page component, however, is measured in columns.

Each column can then be represented as a one-dimensional matrix, or a vector, that lists the components in that column. For Example, the first column could be represented as [1,3,5], the second column as [3,4,5]. By having a known number of columns in the page, the entire page can be represented as a series of vectors. The vectors, read in sequence, can be used to represent the overall page layout. This is so because although the vertical position of each block within a column is defined in relative terms, each block must be continuous across columns.

By having a known number of columns (in some cases as many as 64), each column vector can be analyzed and compared to its neighbors to determine a valid layout for the column-spanning blocks. This also allows the position of each block to be defined in relative terms by having a known and controlled/limited number of columns and enforcing block continuity across columns.

This allows for insert, delete, move, resize, property change, and content change operations to be performed in a shared web document. Because each change affects a series of independent linear spaces (vectors), each vector can be independently mutated/changed and those changes can be propagated to the multiple editors without having to resolve conflicts between the various editors related to which edit command came first. Instead each editor should see the same document regardless of the order in which the various changes are enacted in the document.

This can be realized, in some embodiments, by employing a fixed column position and a variable vertical position within a column for any given block. In such a paradigm, the position of each block in each column becomes independently addressable. Each column can then be treated as a linear, independent address space. Each column of a page in such a paradigm can therefore be treated as a distinct document. To ensure data continuity across columns and avoid ambiguous positioning of blocks that span multiple columns, each block of each column must be accounted for. Also, by listing block positions separately in each column, rendering of block positions may be realized using relative positioning within a given column.

Figure 2A:
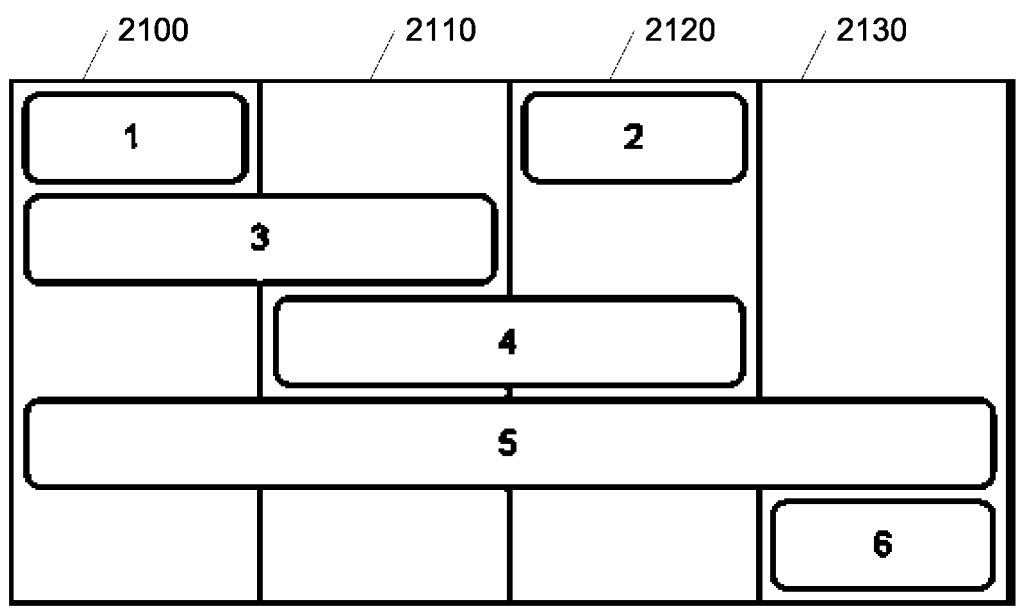
FIG. 2a depicts an exemplary embodiment of a diagram representing a shared document as described herein.

FIG. 2a shows an embodiment of a page divided into columns as described above. In the embodiment shown, the page is divided into four columns 2100, 2110, 2120, 2130. Some blocks 5 may span multiple columns, whereas other blocks 1 may take up only a single column. An individual column 2100 may be represented as a vector of blocks in that column. In the embodiment shown, column 2100 may be represented as [1,3,5]. Such a representation includes only the relative positions of the blocks in the column without accounting for spaces between the blocks. In such an embodiment, column 2110 may be represented as [3,4,5]. Reconciling column-spanning blocks 3 and 5 with respect to these columns, it will become apparent that a space must be inserted between blocks 3 and 5 in column 2100 to account for block 4 being between blocks 3 and 5 in column 2110. In some embodiments, a vector of blocks in a column may be referred to as a vertical index vector, which each block in the vector having a vertical index associated with their relative position in the vector.

Figure 3A:
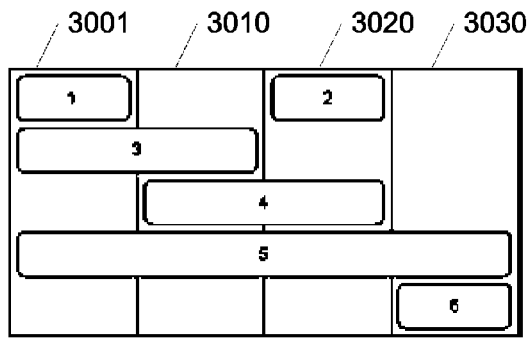
FIGS. 3a-3e depict exemplary embodiments of diagrams representing a shared document undergoing mutations as described herein.

In some embodiments, possible mutations/changes that can be made to a document of the type depicted in FIG. 2*a* include an insertion operation that inserts a block into the document. Embodiments of an insertion operation meant to work with a document divided into columns as shown in FIG. 3*a* may include changes to one or more vertical indexes associated with a block that is being inserted. Embodiments an insertion operation may also include changes to one or more vertical indexes associated with blocks adjacent to the block being inserted. Embodiments of an insertion operation may include a check to see if the insertion operation's affected columns intersect the affected columns of other operations. Embodiments of an insertion operation may include, for each column affected by multiple operations, a determination of whether the vertical index of the insertion operation needs to be incremented or decremented based on preceding or concurrent operations.

In some embodiments, possible mutations/changes that can be made to a document of the type depicted in FIG. 2*a* include a deletion operation that removes a block from the document. Embodiments of a deletion operation meant to work with a document divided into columns as shown in FIG. 2*a* may include changes to one or more vertical indexes associated with a block that is being deleted. Embodiments a deletion operation may also include changes to one or more vertical indexes associated with blocks adjacent to the block being deleted. Embodiments of a deletion operation may include a check to see if the deletion operation's affected columns intersect the affected columns of other operations. Embodiments of a deletion operation may include, for each column affected by multiple operations, a determination of whether the vertical index of the deletion operation needs to be incremented or decremented based on preceding or concurrent operations. Embodiments of a deletion operation may also include operations that read or otherwise verify a unique identifier associated with a block, such as a block ID. Such verification may help prevent inadvertent or otherwise unintended deletion of blocks other than the one selected for deletion.

In some embodiments, possible mutations/changes that can be made to a document of the type depicted in FIG. 2*a* may include a move operation that changes the positioning of a block within the page. Embodiments of a move operation meant to work with a document divided into columns as shown in FIG. 2*a* may include changes to one or more vertical indexes associated with a block that is being moved. Embodiments a move operation may also include changes to one or more vertical indexes associated with blocks adjacent to the block being moved. Embodiments of a move operation may be treated, in some cases, like a block deletion operation for the block at a first column and vertical index followed by a block insertion operation for the same block at a second column and vertical index.

In some embodiments, block insertion, deletion, and move operations may be resolved using block parameters such as a starting column, starting column vertical index, and block size. In some embodiments, block size may be established as both a block width and a block height. In some embodiments, a block width may be represented as a number of columns occupied by the block. In some embodiments, each block in a page may also be associated with a unique identifier such as a block ID. In some embodiments, such a block ID may be used to ensure that mutations are applied to the proper/intended block(s).

In some embodiments, possible mutations/changes that can be made to a document of the type depicted in FIG. 2*a* may include a modify operation that changes the properties of a block. Variations of a modify operation may include altering a width or height of a block. Embodiments a modify operation may include changes to one or more vertical indexes associated with blocks adjacent to the block being modified.

One embodiment of insertion, deletion, and move operations may accept, as input parameters, a block ID, a starting column in the document, and an array of vertical indexes that indicates the vertical index of the block in each column where the block occurs. Referring again to FIG. 2*a*, For block 3 the starting column 2100 may be represented as 0 (or as 1 depending on whether the column count begins at 0 or 1—for the remainder of this document it will be assumed that counting begins at 0, however such an assumption relates only to particular embodiments discussed herein and does not otherwise limit the scope and nature of the concepts presented) and the vertical index array/vector may be represented as [1, 0]. By contrast block 2 would have a starting column of 2 and a vertical index array of [0]. Block 4 would have a starting column of 1 and a vertical index array of [1, 1]. Block 5 would have a starting column of 0 and a vertical index array of [2,2,2,0].

Such an embodiment of the vertical index array of each block also indicates, based on the number of entries in the array, how many columns the block spans. A series of blocks with starting columns and vertical index arrays can therefore be used to establish the layout of the page by applying the vertical indexes of the block to each column where the block occurs and then adding spacers to the vertical arrangement of the blocks in that column to ensure that each block is horizontally continuous across columns.

Therefore, looking at column 2100 by itself, it seems the block 1 is on top, block 3 is below block 1, and block 5 is below block 3. However, column 2110 by itself shows block 3 on top, block 4 below block 3, and block 5 below block 4. From this we can tell that blocks 3 and 5 appear in both columns 2100 and 2110. From this we can also tell that block 1 is above block 3 and block 4 is between blocks 3 and 5. A valid layout therefore includes a blank space above block 3 in column 2 and a blank space between blocks 3 and 5 in column 1. The columns themselves can also be represented as vectors or arrays based on relative block position within the column. Column 2100, for example, can be represented as the vector [1,3,5] whereas column 2120 can be represented as the vector [2,4,5]. A mutation, or change to the document, can be represented as a change to all the relevant columns.

Figure 3B:
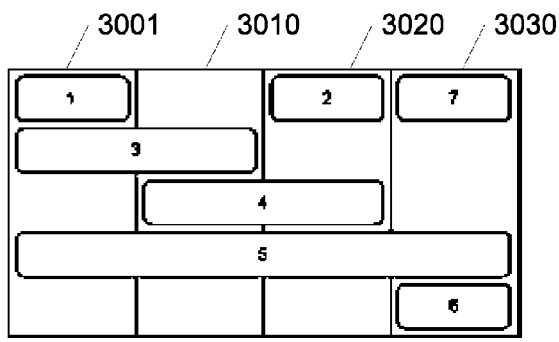
Figure 3C:
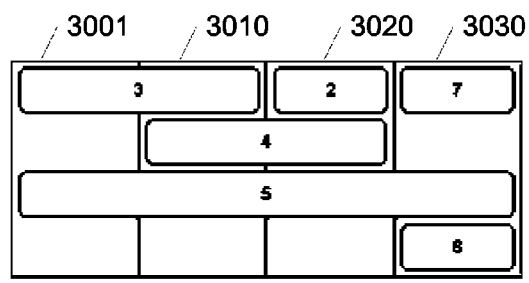

An example of such mutations is shown in FIGS. 3*a*-3*f*. Starting with the document as represented in FIG. 3*a*, the columns of the document can be represented in array form as: [[1,3,5],[3,4,5],[2,4,5],[5,6]]. Inserting block 7 into column 3030 as shown in FIG. 3*b* will change the representation of column 3030 to be [7,5,4]. As shown in FIG. 3*c*, removing block 1 will change the representation of column 3001 to be [3,5].

In the embodiment shown, Block 3 is now the top block in columns 3001 and 3010, the leading space that was in column 3010 is now removed along with the deletion of block 1. Such embodiments may not allow for or may otherwise remove leading spacers in a column where a block could otherwise occupy the area held by the leading spacer. In such an embodiment, the columns of the document represented in FIG. 3c can be represented in array form as: [[3,5],[3,4,5],[2,4,5],[7,5,6]].

Figure 3D:
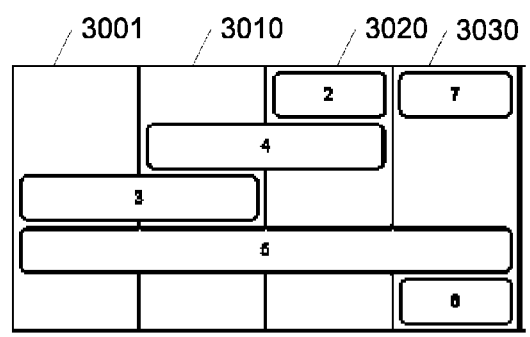

Moving block 3 so that it is now below 4, as shown in FIG. 3d, will not affect the representation of column 3001 because block 3 remains on top of block 5. Similarly, the representation of column 3020 is not affected because block 4 remains below block 2. The representation of column 3010, however, now becomes [4,3,5]. Additionally, leading spaces are now introduced into columns 3001 and 3010 to ensure that each block is continuous across all the columns it occupies.

Figure 3E:
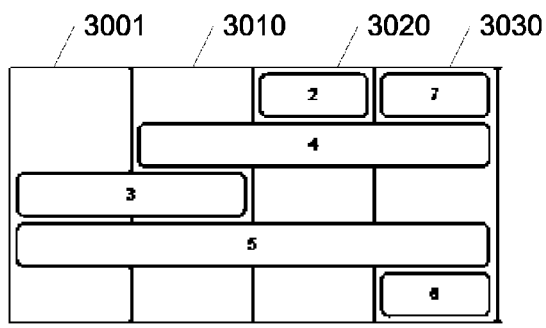

Changing the size of a block, as shown in FIG. 3e, may affect the representation of the columns that a block is moved into or out of. In the embodiment shown, the representation of column 3030 now becomes [7,4,5,6] as a result of extending the width of column 4. In some variations, extending the height of a block may cause the addition of spacers into nearby columns. For example, in an embodiment where column 4 is doubled in height (not shown), an additional spacer may be included in column 3001.

By representing each block's position in the document with a starting column and a row index, it is possible to use relative positioning concepts within each of the page columns without causing unstable behavior in the overall document. A row index represents a column order of a block in each column where the block occurs. Block 3 of FIG. 2a, for instance, would have a starting column of 0 (counting from 0) and a row index of [1,0]. This means that block 3 starts at column 2100, it is the $2^{nd}$ item in that column, and the first item in the subsequent column. By using this technique, two simultaneous operations (that is, two operations occurring at the server-side simultaneously regardless of actual temporal relationship) can be resolved by arbitrarily choosing one to be first and, based on the type of operation chosen first, either incrementing or decrementing the row index of the block associated with the second operation.

An embodiment of a row index increment and/or decrement matrix for operation combinations is shown in FIG. 2b. In the embodiment shown, a matrix 2200 is depicted for a first mutation and a second mutation occurring in sequence on the "master" document. For example, in a case where a delete operation 2240 is followed by another delete operation 2210, the row indexes of the block associated with the second delete operation 2210 should be decremented if that block is above the deletion point of the first delete operation 2240. Alternately, in a case where a delete operation 2240 occurs before a move 2230 or insert 2220 operation, the row indexes of the block associated with the insert 2220 or move 2230 operation should be decremented if the block to be deleted is above the point where a block is to be inserted 2220 or moved to 2230. In the case of a block insertion 2250 followed by any other operation, the vertical indexes of the block associated with a subsequent operation should be incremented if the block undergoing the subsequent operation is the insertion 2250 block is above the subsequent operation point.

Such incrementation of vertical indexes allows multiple operations to be converged without creating ambiguity and without requiring that the document be associated with a particular state. Some embodiments may adopt a last-one-wins semantic structure where mutations are converged at the "master" document in the order in which they are received by a server hosting the "master" document.

Figure 1B:
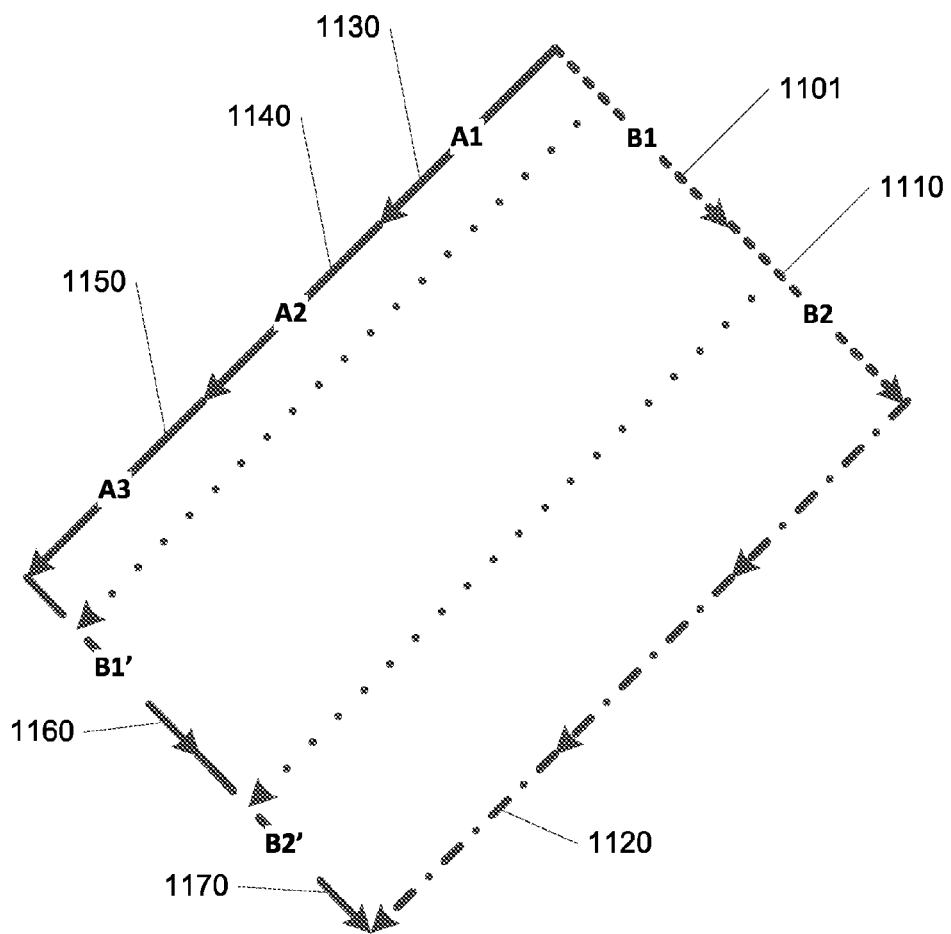
FIG. 1b depicts an embodiment of a diagram representing a convergence of multiple mutations from two user states in a shared document.

FIG. 1b shows a multiple-step mutation convergence process. In such a situation, multiple changes may have occurred simultaneously as a result of actions taken by multiple users/editors. In the embodiment shown in FIG. 1b, a series of "master" document mutations 1101, 1110 needs to be converged with a series of local mutations 1130, 1140, 1150. The two "user" states being converged in the example shown are therefore those of the "master" or server-side document and those of a local user making changes to a locally cached or otherwise locally accessible document instance.

Figure 2C:
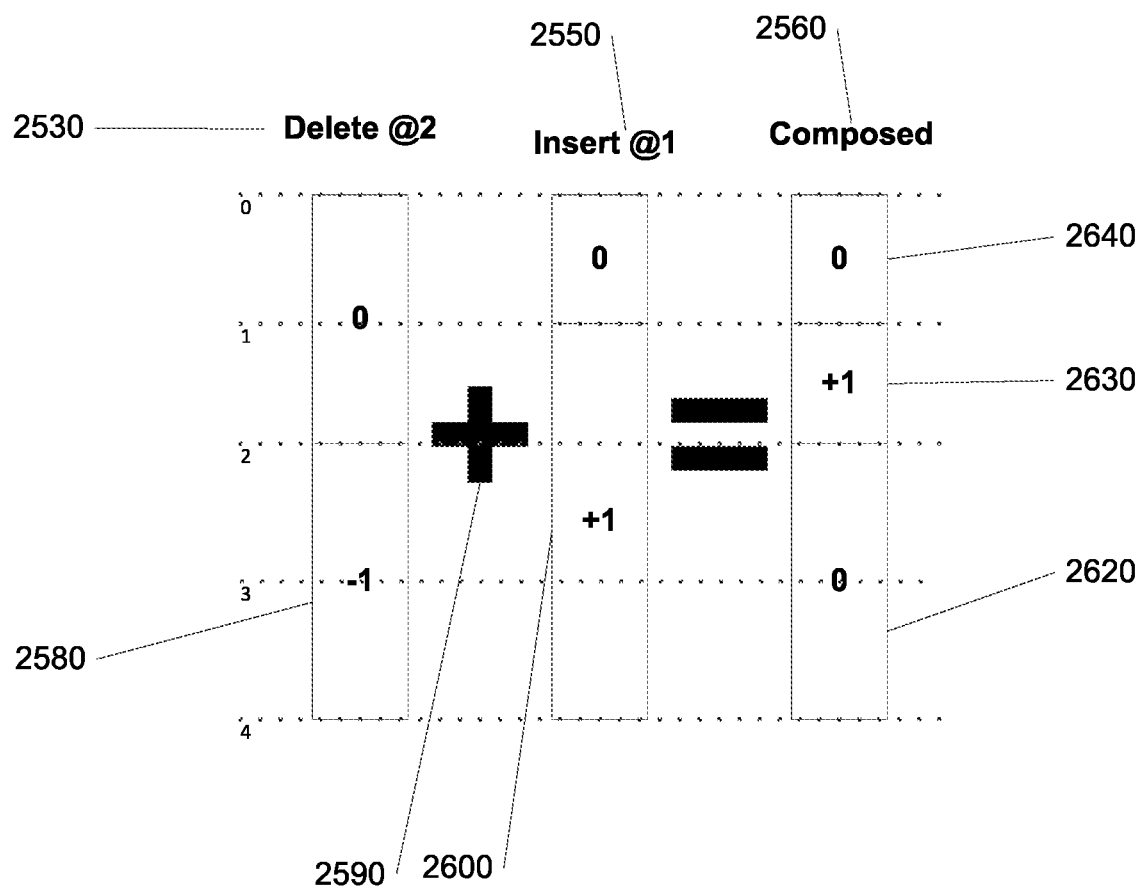
FIG. 2c depicts an exemplary embodiment of a convergence of mutations into a composed transfer function as described herein.

Using operational transforms, each "master" mutation must be transformed against each local mutation. Depending on the frequency of updates, a pending mutation list at the "master" and local document instances can become long, making the convergence process slow. Some efficiencies, however, can be realized by composing the transforms from the local mutations together 1120. An example of how such mutations can be composed together is shown in FIG. 2c.

In the embodiment shown, a single delete operation at index 3 in a column 2530 will create a transform function that decrements the indexes 2580 of all subsequent mutations affecting indexes greater than 2 in that column. An insert block mutation in the same column at index 1 will increment the indexes all subsequent mutations 2600 affecting indexes greater than 0 in that column. Combining 2590 these two operations into a composed transform function 2560 results in a transform function that leaves mutation indexes less than 1 alone 2640, increment mutation indexes 1 and 2 2630, and leave indexes 3 and 4 alone 2620 because the increment 2600 of the insertion 2550 cancels out the decrement 2580 of the deletion 2530.

Such a composed transfer function 2560 may be further extended to any number of mutations, with each mutation simply incrementing or decrementing all index values above or below the affected positions. Because the composition process is iterative, a composed transfer function 2560 may be used as the foundation for another composition with yet another mutation, creating a different composed transfer function. In this manner, any number of mutations may be composed together to create a transfer function that may then be applied to the "master" document and/or propagated back to locally cached instances of the "master" to facilitate ongoing collaboration and editing.

Figure 1C:
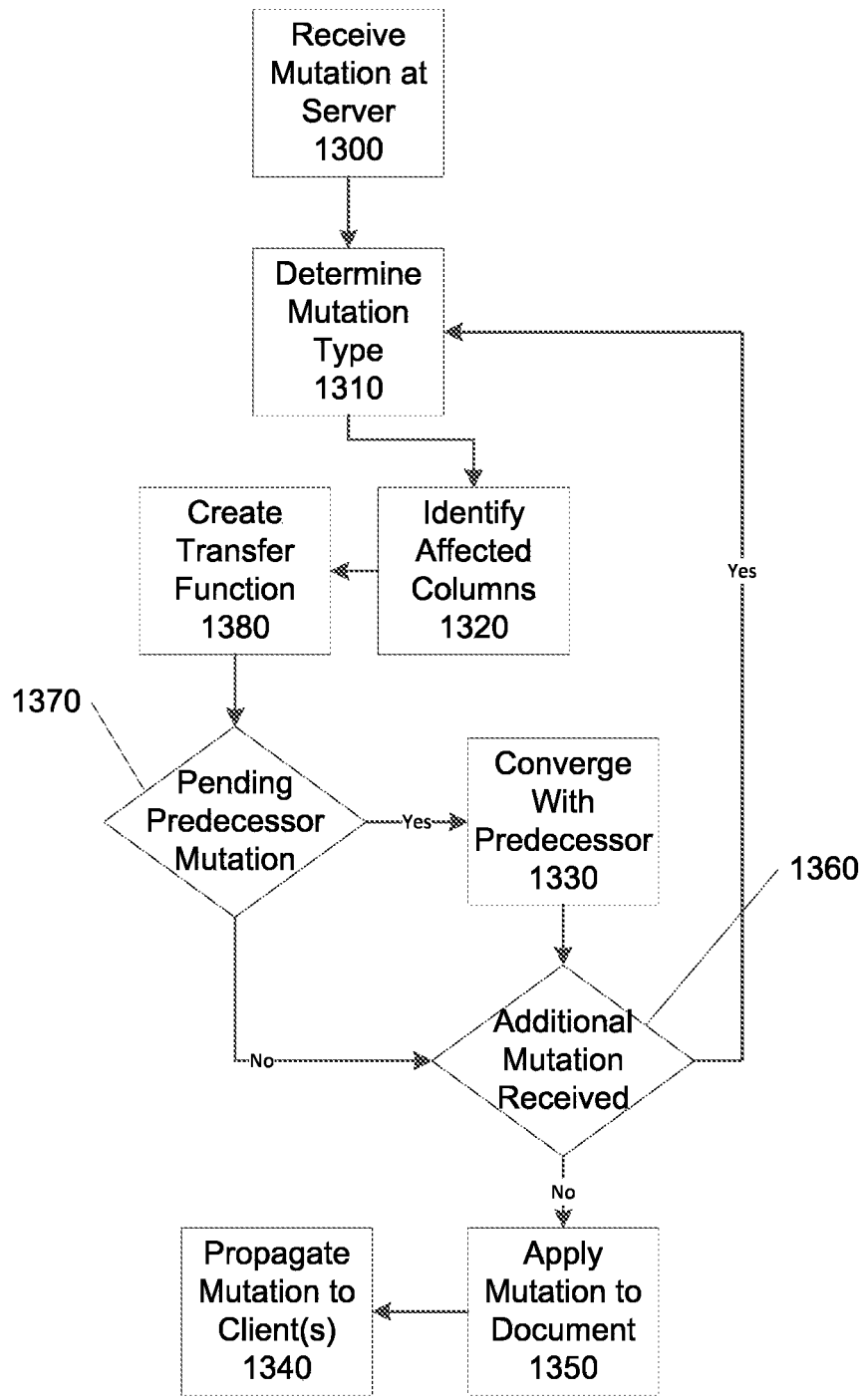
FIG. 1c depicts a diagram representing an embodiment of a mutation convergence and application process.

FIG. 1c shows an embodiment of a mutation receipt, convergence, and application process which may be employed to apply and propagate mutations arising from a collaborative, distributed editing process. In the embodiment shown, a mutation triggered or applied by a user to their locally cached document instance may be received 1300 at a server hosting or otherwise controlling the "master" document. The mutation type may be determined 1310 in accordance with one or more of the embodiments described herein. For embodiments related to documents that are divided into multiple, block-bearing columns such as those discussed above, the columns affected by the mutation may be identified 1320. A transfer function may then be created 1380 either for the affected columns or, in some embodiments, for the entire document, based on the received mutation.

In some embodiments, a column identification process 1320 may be used to further refine and inform a determination of whether there are any predecessor mutations 1370 pending but not yet applied to the master document. If it is determined there are such pending processor mutation(s), the received mutation may be converged with the processor mutation(s) 1330 to create a converged transfer function.

In some embodiments, the column identification process 1320 may be used to separate the received mutation into individual mutations to be applied to individual columns. A determination of pending processor mutations 1370 may then be made on a column-by-column basis. The convergence of the received mutation with any pending predecessor mutations may also then proceed on a column-by-column basis. In some embodiments, an identification of the affected columns may be omitted or may be implicitly included in a mutation application step 1350. In such embodiments, any mutation convergence 1330 may be performed for each column in the document regardless of mutation type.

In some embodiments, an identification of the mutation type 1310 may also be omitted or otherwise included in either or both of the mutation convergence 1330 and/or mutation application 1350 processes. In some embodiments, an identification of the mutation type 1310 may include the step of generating a representation of the received mutation as a transfer function 1380 suitable for convergence with another transfer function 1330 or application to the document 1350.

After all pending mutations are converged 1330 into a transfer function or, if there are no additional mutations received during that time 1360, the converged mutations 1330 may be applied to the master document 1350 and propagated back to all the locally cached document instances currently open for viewing or editing 1340. In embodiments where convergence with predecessor mutation(s) 1330 is not required, a check for additional incoming mutations 1360 may nonetheless be performed before applying 1350 and propagating 1340 the mutation.

In some embodiments, the receipt of an intervening mutation 1360 may cause the current mutation or converged mutations to become pending while a mutation type 1310 is determined for the intervening mutation. In some embodiments, if the intervening mutation does not affect any of the columns affected by the pending mutation, the pending mutation may be applied 1350 and propagated 1340 while the intervening mutation is processed and prepared for application to the document 1350.

Although discussed with respect to embodiments having a fixed number of columns and a fixed or otherwise set column width, other embodiments of the techniques and solutions discussed herein may vary a number of columns and/or a column width dynamically based on a number of density of blocks in a document or document region. In some embodiments, when a number of columns is varied in a document—either globally or locally—an array re-mapping operation may occur to map the block heights, widths, starting columns, and row index values from a starting document column configuration to a desired document column configuration. For example, in a situation where a number of document columns is to be doubled to account for increased block density, each document column may be split into two, with the positions and row indexes of the blocks being re-mapped appropriately. In some embodiments where one or more columns may be added or the column count of a document is otherwise increased, existing blocks may be assumed to span the newly added or to-be-added column if they touch or otherwise intersect the column. In some embodiments, such column addition or column insertion techniques may be realized locally within a content-dense document region and/or globally throughout the document.

In a situation where a region of a document may have little or no content, a reduced number of columns may be utilized to represent that document region. In some embodiments, a column may be removed, with the blocks spanning or otherwise occurring in that column being shifted or reduced in terms of their horizontal span. In other embodiments, two or more document columns in that document region may be merged into one, with positions and row indexes of blocks in those columns being re-mapped appropriately. Such reductions in horizontal span may not affect the display or presentation or even size properties of a block, and may instead be related only to the new, reduced, number of columns spanned by the block.

Figure 3F:
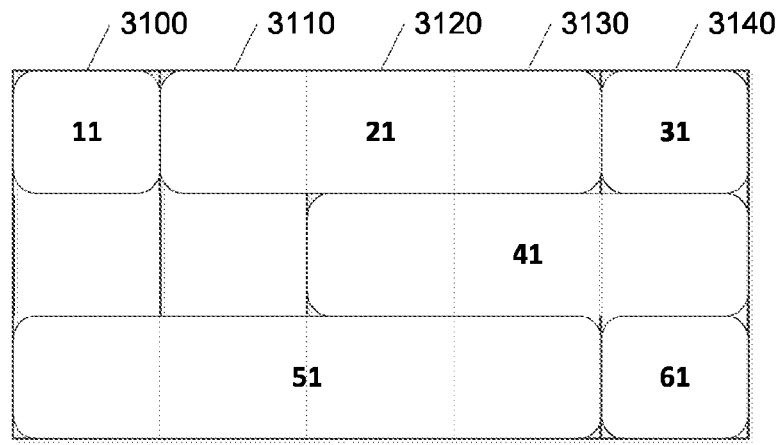
FIG. 3f-3h depict exemplary embodiments of diagrams representing changes to the number of columns in a document.
Figure 3G:
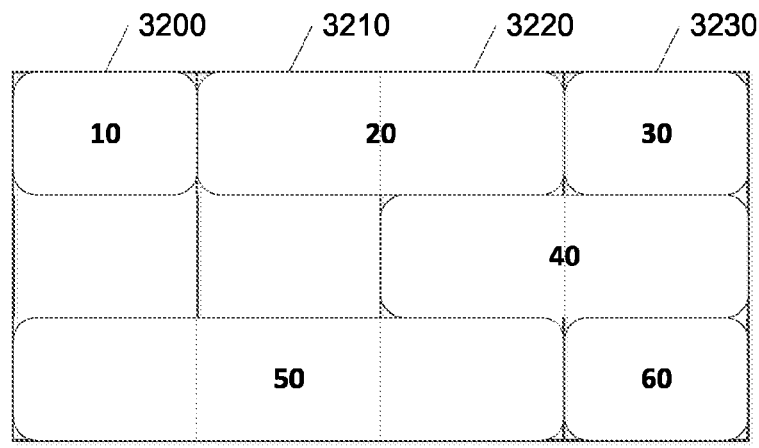

FIGS. 3*f,* 3*g,* and 3*h* show an embodiment of column increase (FIG. 3*h*) and column reduction (FIG. 3*g*). Starting with the document shown in FIG. 3*f,* there are five columns 3100, 3110, 3120, 3130, 3140, each of which include one or more blocks. In the embodiment shown, column 3100 can be represented as [11, 51]. Column 3110 can be represented as [21, 51]. Columns 3120 and 3130 can both be represented as [21, 41, 51]. Column 3140 can be represented as [31, 41, 61].

FIG. 3*g* depicts an embodiment where a column is removed from the document or where the number of columns is otherwise reduced. In FIG. 3*g,* there are four columns 3200, 3210, 3220 and 3230. In one embodiment, this may be realized by removing column 3120 or column 3130 from the document shown in FIG. 3*f.* In another embodiment, this may be realized by merging columns 3120 and 3130 from the document shown in FIG. 3*f.* In yet another embodiment, the overall layout of the entire document may be captured and re-mapped to a different number of columns without identifying particular column(s) for removal or merging. In the embodiment shown, column 3200 can be represented as [10, 50]. Column 3210 can be represented as [20, 50]. Column 3220 can be represented as [20, 40, 50] and column 3230 can be represented as [30, 40, 60].

Figure 3H:
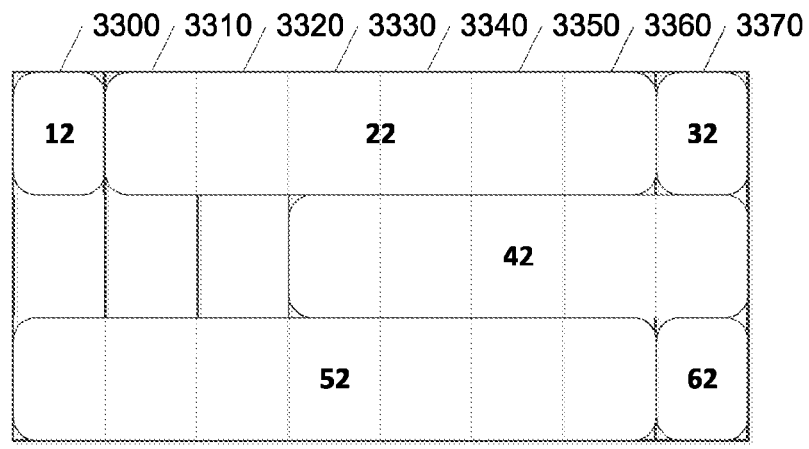

FIG. 3*h* depicts an embodiment where columns are added to the document or where the number of columns is otherwise increase. In the embodiment shown, the number of document columns is increased to eight: 3300, 3310, 3320, 3330, 3340, 3350, 3360, 3370. This may be realized by adding one or more new columns between the columns shown in FIG. 3*f,* by splitting one or more of the columns shown in FIG. 3*f* into two or more portions, and/or by capturing the overall layout of the entire document and re-mapping it to a different number of columns without identifying particular columns to be inserted, moved, or split. In the embodiment shown, column 3300 can be represented as [12, 52] and column 3370 can be represented as [32, 42, 62]. Columns 3310 and 3320 can both be represented as [22, 52] and columns 3330, 3340, 3350, and 3360 can all be represented as [22, 42, 52].

Figure 4A:
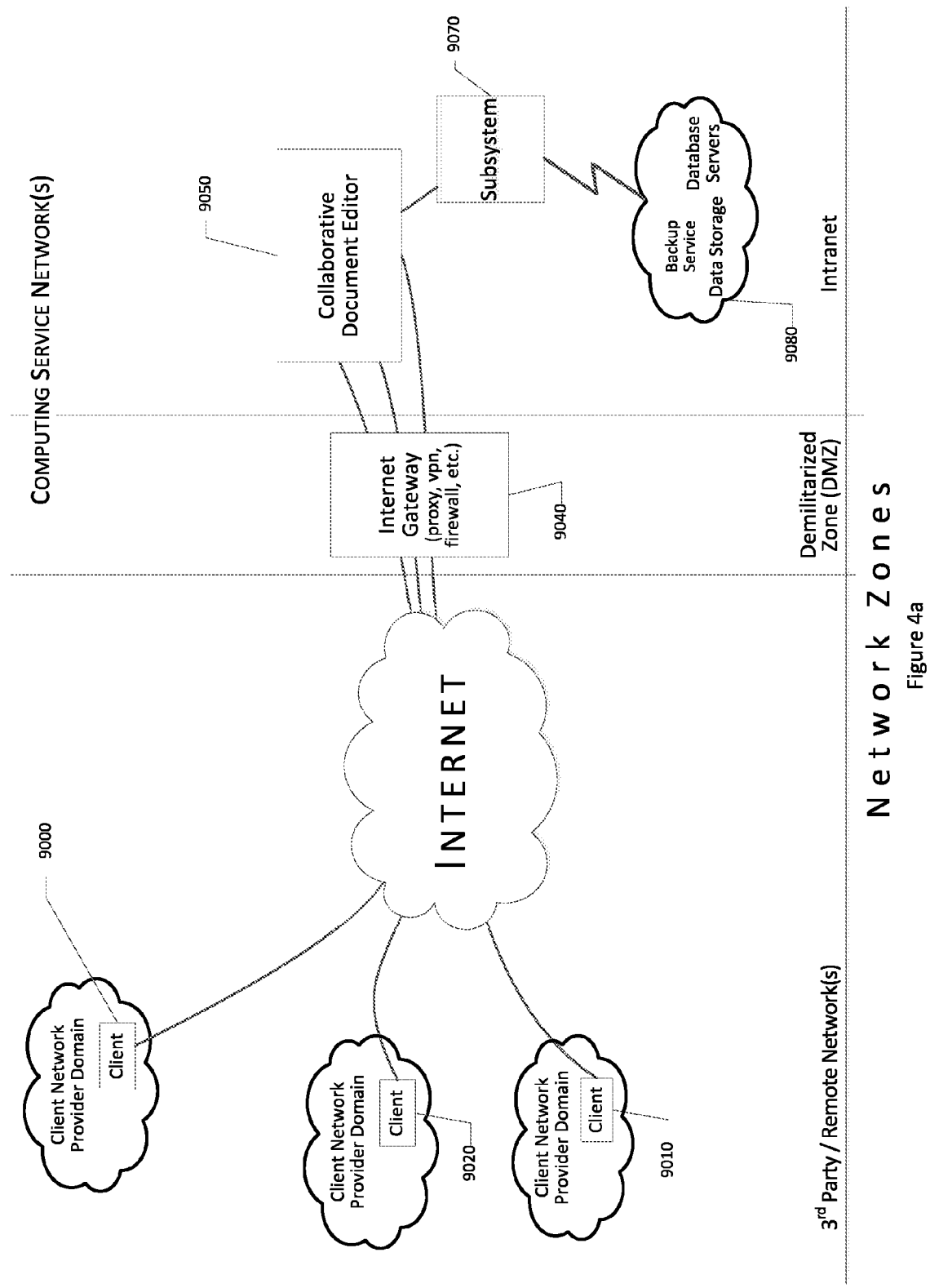
FIG. 4a depicts an exemplary embodiment of a network computing environment.

Although discussed in relation to an internet-based or web-based client-server environment having one or more clients, such a collaborative document editing solution may be applicable to other environments as well. In one exemplary embodiment of a web-based collaborative document editing environment, a document may be hosted or otherwise managed in the manner shown in FIG. 4*a.* In the figure shown, the document may reside on a server, computer, database, virtual machine, or combination thereof 9050 that may be regarded as a primary system. In some embodiments, the primary system 9050 may be a module, set of modules, server, or set of servers that stores and controls access to a shared document via the distributed computing environment. In some exemplary embodiments, the primary system 9050 may be an application server in a data center. In some exemplary embodiments, the primary system 9050 may correspond to one or more physical and/or logical processing modules or computing devices in a data center. In some embodiments, the primary system 9050 may grow or shrink to occupy multiple and/or partial portions of various logical or physical processing modules in a data center and/or spanning multiple data centers. In some embodiments, a logical processing module may be created from one or more physical processing modules or portions thereof within a data center or across multiple data centers.

In some embodiments, supporting features, such as data storage, back-ups, maintenance features, and payment and authentication interfaces may reside on one or more sub-systems 9070, which may be part of the same virtual machine or different virtual machines, or may be part of the overall cloud computing infrastructure and not tied to a particular virtual machine that a user can invoke or otherwise configure. Such sub-systems may include services or features such as transaction handlers, database connections, and/or back-up and maintenance 9080. In some embodiments, such sub-system(s) 9070 may include features, components, or functional units meant to facilitate online collaborative editing of a web page or other variable-layout document by multiple users.

In exemplary embodiments of web-based collaborative document editing environments where authentication services may be offered as part of the system infrastructure, a connecting entity designating a client 9000, may initiate and conduct communications with a provisioned communication gateway 9040 via a network or internet connection as an initial step in accessing a primary system 9050. Exemplary embodiments of such provisioning may, for purposes of facilitating a secure computing environment and discreet handling of data, enforce encryption of communication channels using strong authentication mechanisms, compartmentalized handling, processing, and storage of data, as well as exhaustive application of system hardening techniques that include documented, routine maintenance of system and application patches, monitored and access-restricted ingress and egress network ports and services, and lastly routine reviews of system and security logs. Further exemplary embodiments of such provisioned communication gateways may implement additional functionality such as load balancing across one or more applications in a cloud computing environment—either within a cloud or across multiple clouds.

In some exemplary embodiments, the gateway 9040 may be in a demilitarized zone (DMZ) between the internet and the primary system 9050. As noted previously, the primary system 9050 is the module, set of modules, server, or set of servers that stores and controls access to the shared document via the distributed computing environment. The overall computing environment may also reside behind the DMZ. In the exemplary embodiment shown, the client 9000, which may be one of any number of clients 9020, 9010 (existing on any number of separate client networks), connects to the primary system 9050 via the gateway 9040. At or shortly after connection, the document access application (not shown) recognizes the client 9000 and looks at any additional information related to the client, such as financial data or remote profile information or any relevant data for particular documents, features, or information types being managed or utilized by the system. Such additional information may be accessed or provided either within the computing environment or, in the case of external data, via an external service transaction handler (not shown). In some exemplary embodiments, multiple external service transaction handlers may reside on one or more service provider domain networks.

In some exemplary embodiments, the DMZ may include an authentication mechanism for authenticating users and, in some exemplary embodiments, generating a session token. In some exemplary embodiments, the transaction handler may be part of an overall transaction management solution used across a range of services, including payment for computing resources. The primary system 9050 and, in some exemplary embodiments, any associated sub-systems 9080 may reside in one or more computing devices of the type shown in FIG. 4b.

Figure 4B:
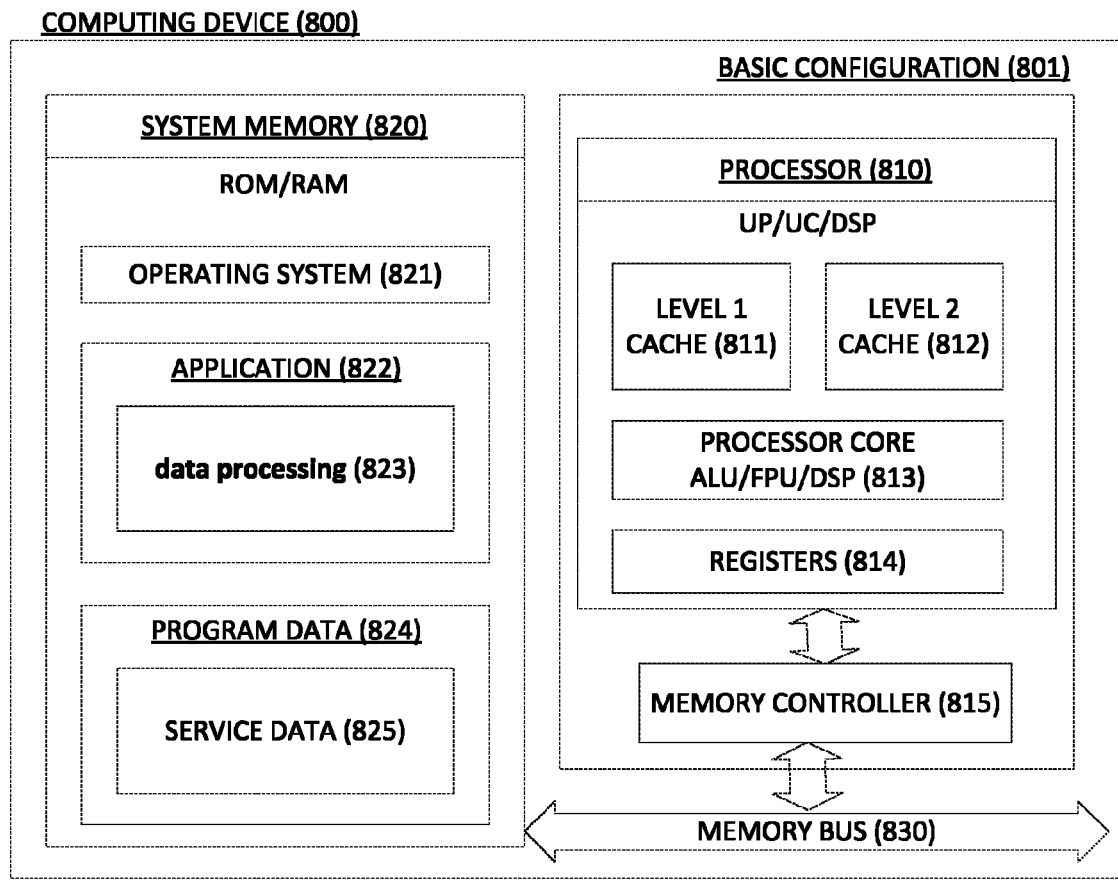
FIG. 4b depicts an exemplary embodiment exemplary of a computing device.

As noted above, the processing elements of a data center may be embodied as part of, all of, or multiple computing devices. FIG. 4b is a block diagram illustrating an example computing device (800) that is arranged for data processing and/or executing applications and may be used for one or more primary system(s) 9050 and/or subsystems 9070 and/or associated resources 9080 in a computing environment. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (804) (such as RAM), non-volatile memory (803) (such as ROM, flash memory, etc.) or any combination thereof. System memory (820) typically includes an operating system (821), one or more applications (822), and program data (824). The application (822) may include an application that can perform resource management and allocation, such as evaluating resource usage within one or more computing devices (800) in a data center. Program Data (824) includes storing instructions that, when executed by the one or more processing devices, implement a set of processes that gather data about all other applications, application instances, and/or other resource usage and allocation ongoing within a data center that includes the computing device (800). In some embodiments, the application (822) can be arranged to operate with program data (824) on an operating system (821). In some exemplary embodiments, such an application (822) may be one of several operating on the computing device (800). In some exemplary embodiments, the application (822) may include various data processing (823) capabilities or features, which may vary depending on the type of data being processed and/or operated on by the application (822).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (800) can also be implemented as a personal computer including both laptop computer and non-laptop computer configurations. The computing device (800) can also be implemented as a module or rack element in a server or server array, or as a primary system 9050 and/or subsystem 9070 and/or associated resource 9080 that is a virtual or logical construct representing a defined or otherwise measured portion of computing resources available within a data center. In such virtual machine exemplary embodiments, the computing device (800) may be an abstract representation of underlying hardware components having configurations similar to that of the computing device (800) but with different parameter or properties (such as more or fewer processors and/or memory, for example). The parameters, configuration, and settings of a a web-based collaborative document editing environment may also be represented at least in part as a basic configuration 801 of one or more computing device(s) 800. Such a computing environment may have no specific physical structure, but may instead be represented by resources allocated from part, all, or several physical computing devices 800 (which may themselves be included in one or more data centers).

The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some exemplary embodiments may be embodied in combinations of hardware, firmware, and/or software. Some exemplary embodiments may be embodied at least in part on non-transitory computer-readable storage media such as memory chips, hard drives, flash memory, optical storage media, or as fully or partially compiled programs suitable for transmission to/download by/installation on various hardware devices and/or combinations/collections of hardware devices. Such exemplary embodiments are not to be regarded as departure from the spirit and scope of the systems and solutions discussed herein, and all such modifications as would be obvious to one skilled in the art are intended to be included within the scope of the following claims:

The invention claimed is:
1. A system for applying multiple changes to a shared document in a state-less manner, the system comprising:
   a processor; and
   a processor-readable memory having stored thereon a representation of the shared document as a series of one-dimensional vectors, where each one-dimensional vector corresponds to a vertical column of a particular width, the shared document being divided into a particular number of the vertical columns, and where each one-dimensional vector represents a top-down sequential list of blocks in that column, each block representing a content item included in the document and each block being associated with a starting column location, a block height, and a block width, where the block width is represented by a number of columns the block occupies; and where each block is associated with at least one row index, each associated row index representing a relative position of the block in each document column occupied by that block in relation to other blocks in that column; and the processor-readable memory having stored thereon instructions which, when executed by the processor, cause the processor to increase or decrease a row index of a particular block to indicate a change in the relative position of that particular block in each column occupied by the block according to a transfer function, the transfer function representing an effect of a document modification command on a particular column in the document, the document modification command including at least one of an insertion of a new block into the shared document, a deletion of an existing block from the shared document, re-positioning of a block within the shared document, and a change in the height or width of a block within the shared document.

2. The system of claim 1, where the transfer function is a converged transfer function representing cumulative effects of two or more sequentially-applied document modification commands on the particular column in the document.

3. The system of claim 1, where the row indexes of a block spanning two or more columns are set such that the block is represented as a continuous entity within the shared document.

4. The system of claim 1, where a transfer function associated with an effect of a block insertion command on a particular column in the shared document includes incrementing the row indexes of all blocks in the particular column located below an insertion point associated with the block insertion command.

5. The system of claim 4, where a transfer function associated with an effect of a block deletion command on a particular column in the shared document includes decrementing the row indexes of all blocks in the particular column located below a deletion point associated with the block deletion command; and where a transfer function associated with an effect of a block re-positioning command is represented as a converged transfer function representing cumulative effects of a block deletion command and a subsequent block insertion command.

6. The system of claim 5, where a transfer function is represented as a series of increases and/or decreases to row index values of blocks within a column and where a converged transfer function represents a result of adding and reconciling at least two transfer functions.

7. The system of claim 1, where a transfer function associated with an effect of a block deletion command on a particular column in the shared document includes decrementing the row indexes of all blocks in the particular column located below a deletion point associated with the block deletion command.

8. The system of claim 1, where the processor and memory are included as part of a collaborative document editor accessible to multiple users via an information network.

9. The system of claim 1, where the shared document is divided into sixty-four vertical columns.

10. A method of applying multiple changes to a shared document in a state-less manner, where the shared document is represented as a series of one-dimensional vectors, each one-dimensional vector corresponding to a vertical column of a predetermined width, where the shared document is divided into a predetermined number of the vertical columns, where each one-dimensional vector represents a top-down sequential list of blocks in that column, each block representing a content item included in the document and each block being associated with a starting column location, a block height, and a block width, where the block width is represented by a number of columns the block occupies; where each block is associated with at least one row index, each associated row index representing a relative position of the block in each document column occupied by that block in relation to other blocks in that column, the method comprising:

receiving, at a server that controls a master copy of the shared document, a first document modification command, the first document modification command including at least one of an insertion of a new block into the shared document, a deletion of an existing block from the shared document, re-positioning of a block within the shared document, and a change in the height or width of a block within the shared document;

representing the first document modification command as one or more first transfer functions, where each of the first transfer functions corresponds to a column of the shared document;

applying the one or more first transfer functions to the corresponding columns of the master copy of the shared document, where each of the one or more first transfer functions alters a row index of a block in the corresponding column, thereby altering the relative position of that block with respect to other blocks in the corresponding column; and propagating, from the server, the applied transfer functions to at least an originator of the document modification command.

11. The method of claim 10, the method further comprising:

in response to receiving, at the server that controls a master copy of the shared document, a second document modification command before carrying out the step of applying with respect to the first document modification command, representing the second document modification command as one or more second transfer functions, where each of the second transfer functions corresponds to a column of the shared document;

for those columns associated with a first transfer function and a second transfer function, converging the first transfer function and the second transfer function into a converged transfer function, the converged transfer function representing cumulative effects of the first document modification command followed by the second document modification command; and when the step of applying includes applying the one or more first transfer functions and applying the one or more second transfer functions by applying the converged transfer functions to those columns associated with a first transfer function and a second transfer function.

12. The method of claim 10, the method further comprising:
- converging the one or more first transfer functions with one or more predecessor transfer functions associated with one or more previously received but not yet applied document modification commands to create one or more converged transfer functions representing cumulative effects of the predecessor transfer functions command followed by the first document modification command; and
- where the step of applying the one or more first transfer functions to the corresponding columns of the master copy of the shared document is at least partially realized by applying the one or more converged transfer functions to corresponding columns of the master copy of the shared document.

13. The method of claim 10, where a transfer function associated with an effect of a block insertion command on a particular column in the shared document includes incrementing the row indexes of all blocks in the particular column located below an insertion point associated with the block insertion command.

14. The system of claim 13, where a transfer function associated with an effect of a block deletion command on a particular column in the shared document includes decrementing the row indexes of all blocks in the particular column located below a deletion point associated with the block deletion command; and
- where a transfer function associated with an effect of a block re-positioning command is represented as a converged transfer function representing cumulative effects of a block deletion command and a subsequent block insertion command.

15. The system of claim 14, where a transfer function is represented as a series of increases and/or decreases to row index values of blocks within a column and where a converged transfer function represents a result of adding and reconciling at least two transfer functions.

16. The system of claim 10, where a transfer function associated with an effect of a block deletion command on a particular column in the shared document includes decrementing the row indexes of all blocks in the particular column located below a deletion point associated with the block deletion command.

17. The method of claim 10, the method further comprising determining which columns of the shared document are affected by the received document modification command; and where
the step of representing includes generating a transfer function for each column of the shared document affected by the received document modification command.

18. The method of claim 10, where the shared document is divided into sixty-four vertical columns.

19. The method of claim 10, where the number of columns in the document is determined based on a number and distribution of blocks within the document.

20. A non-transitory computer-readable medium having embodied thereon a set of instructions which, when executed by a processor, cause the processor to carry out a method of applying multiple changes to a shared document in a stateless manner, where the shared document is represented as a series of one-dimensional vectors, each one-dimensional vector corresponding to a vertical column of a predetermined width, where the shared document is divided into a predetermined number of the vertical columns, where each one-dimensional vector represents a top-down sequential list of blocks in that column, each block representing a content item included in the document and each block being associated with a starting column location, a block height, and a block width, where the block width is represented by a number of columns the block occupies; where each block is associated with at least one row index, each associated row index representing a relative position of the block in each document column occupied by that block in relation to other blocks in that column, the method comprising:
- receiving, at a server that controls a master copy of the shared document, a first document modification command, the first document modification command including at least one of an insertion of a new block into the shared document, a deletion of an existing block from the shared document, re-positioning of a block within the shared document, and a change in the height or width of a block within the shared document;
- representing the first document modification command as one or more first transfer functions, where each of the first transfer functions corresponds to a column of the shared document;
- applying the one or more first transfer functions to the corresponding columns of the master copy of the shared document, where each of the one or more first transfer functions alters a row index of a block in the corresponding column, thereby altering the relative position of that block with respect to other blocks in the corresponding column; and
- propagating, from the server, the applied transfer functions to at least an originator of the document modification command.

* * * * *